Figure 1:
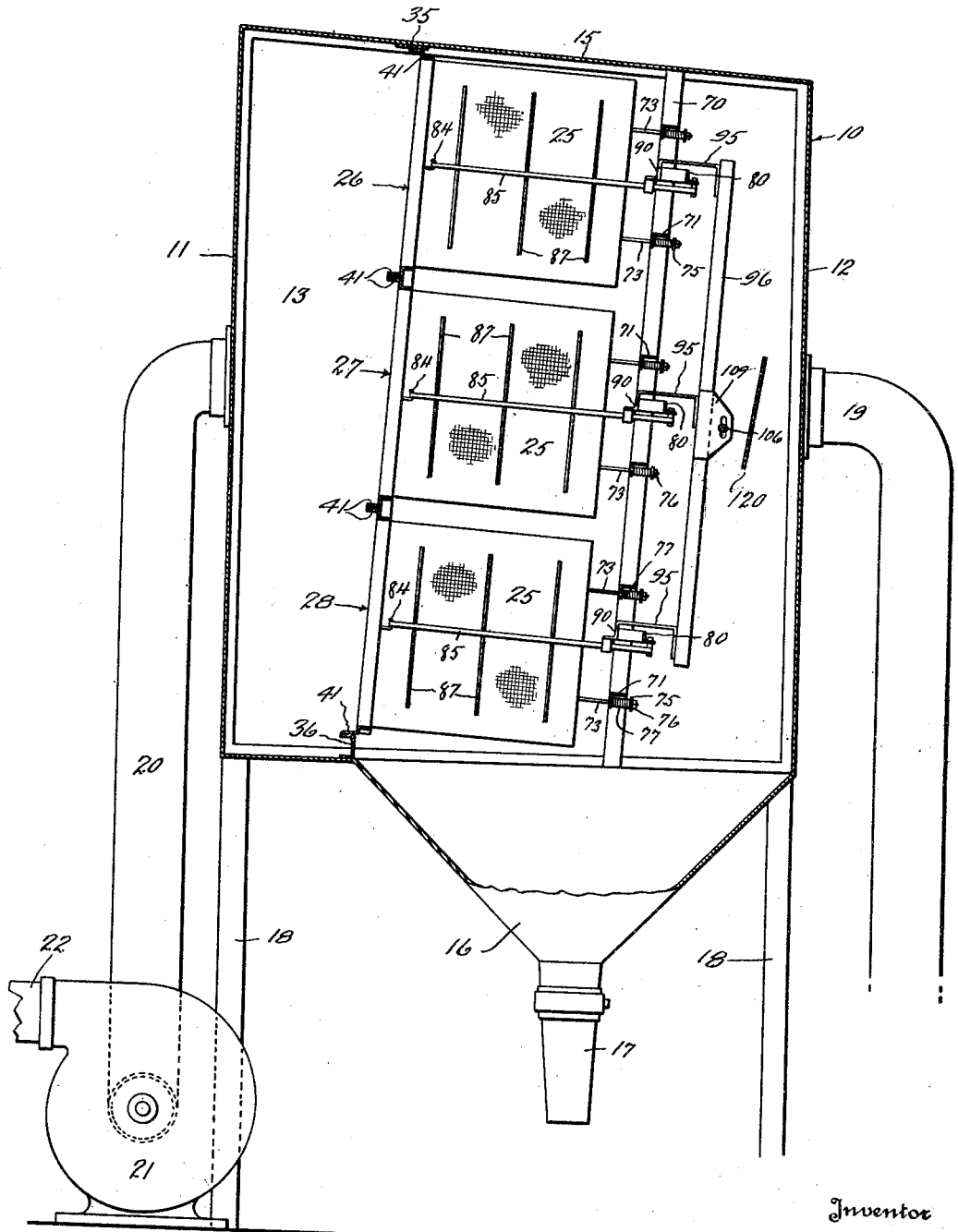

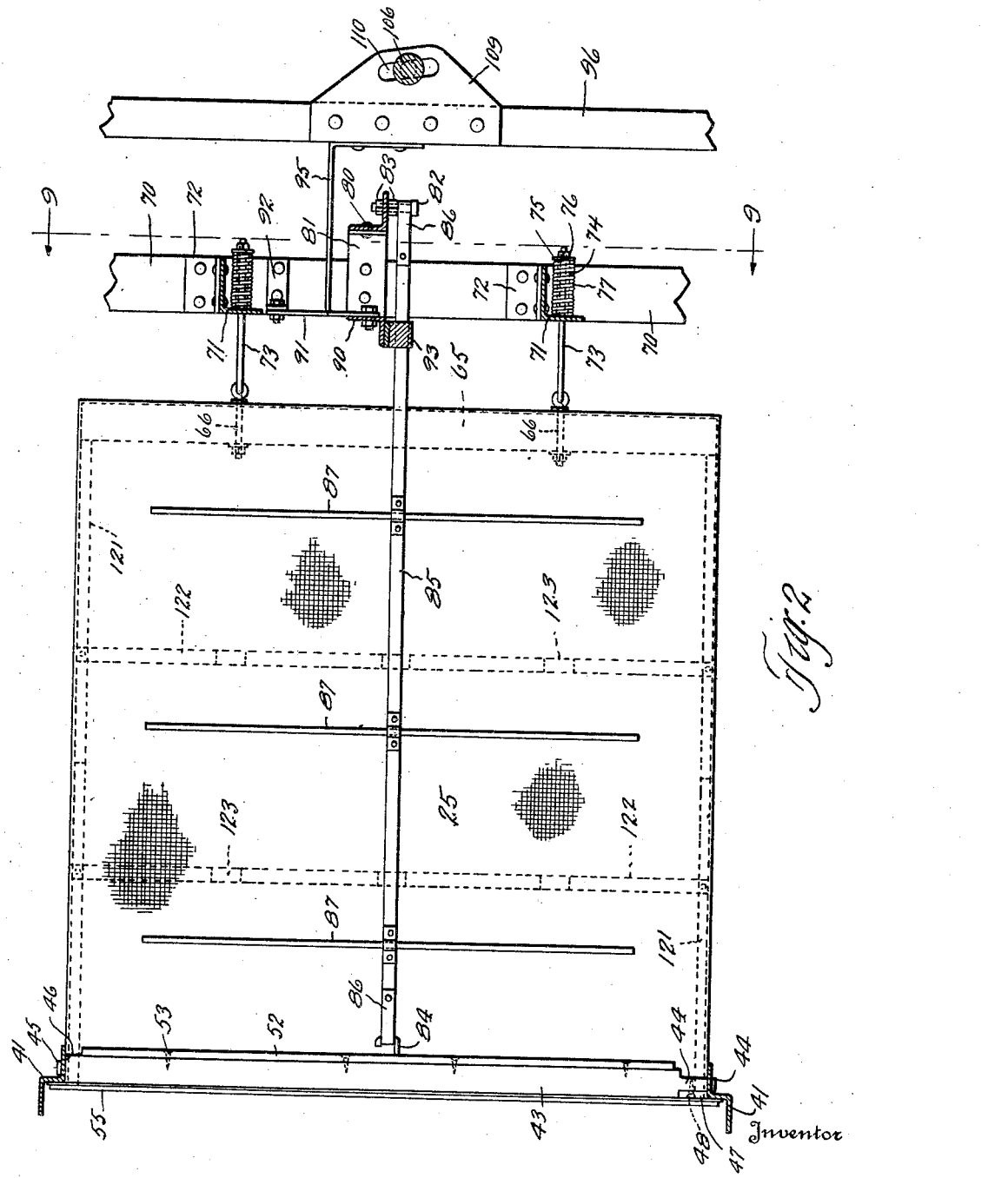

July 26, 1932. G. A. BOESGER 1,868,876
DUST COLLECTOR
Filed Feb. 21, 1931 11 Sheets-Sheet 3
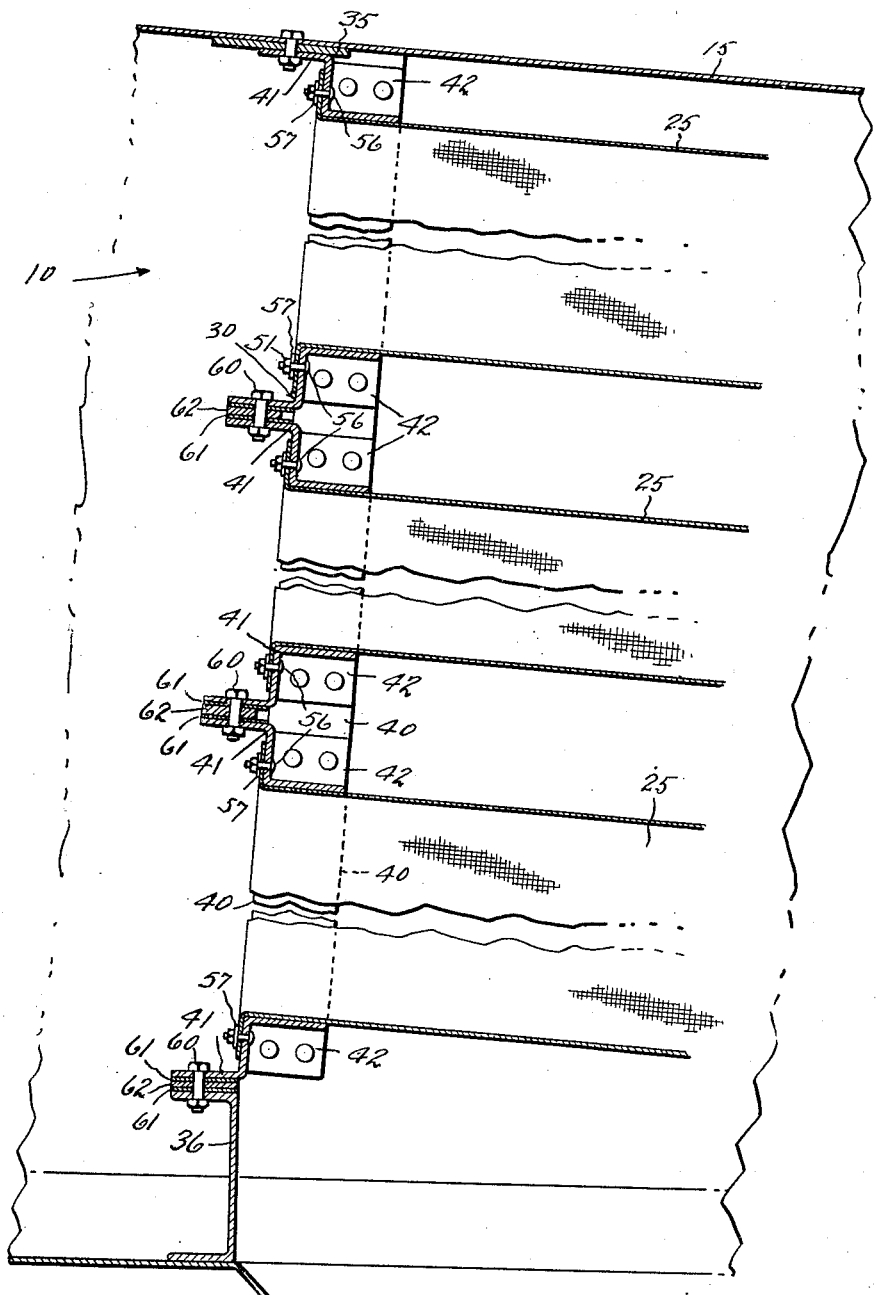

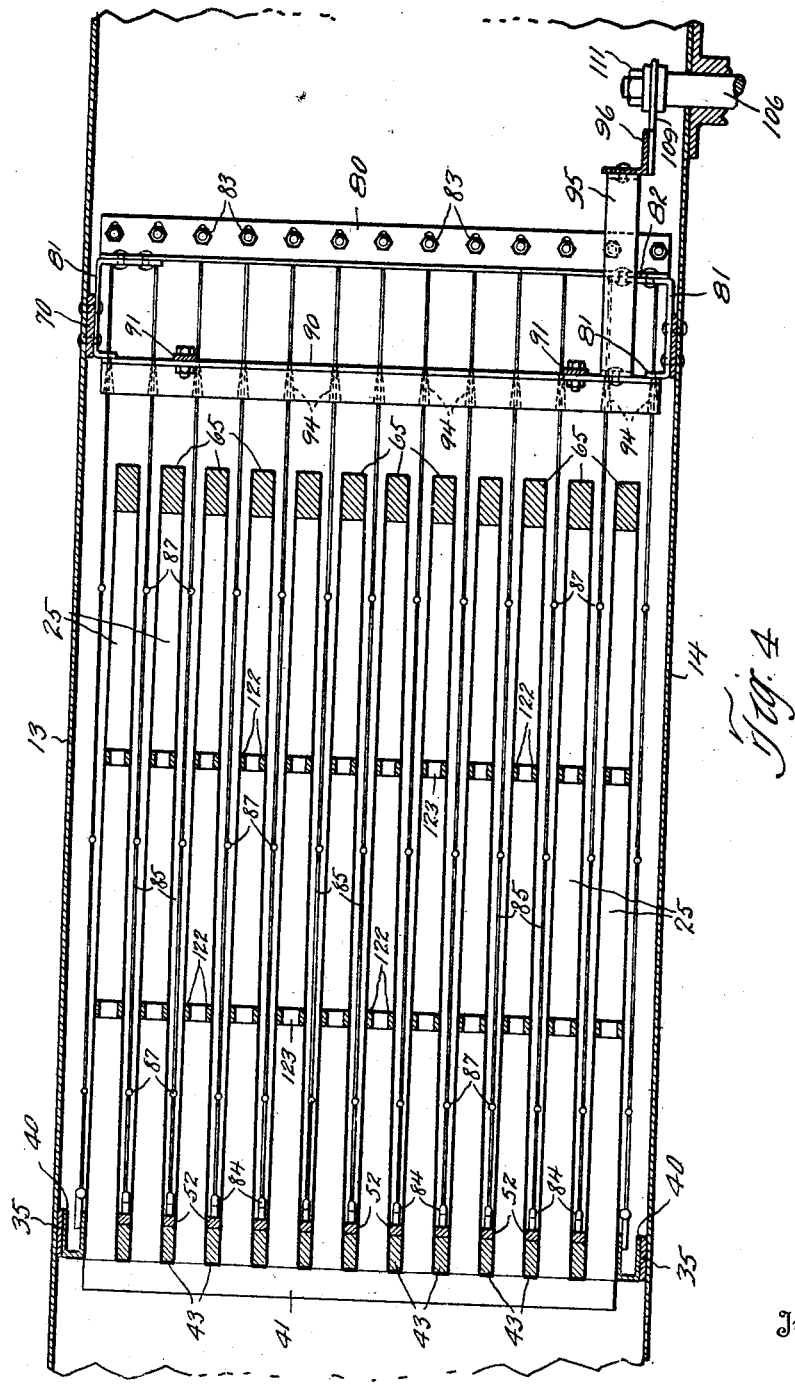

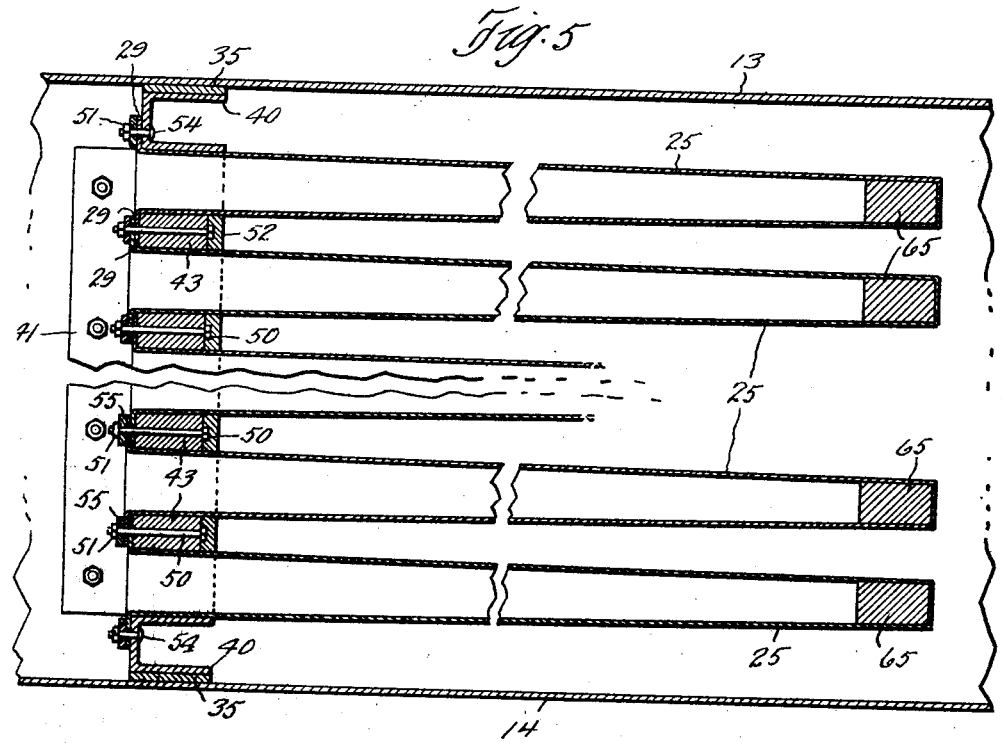
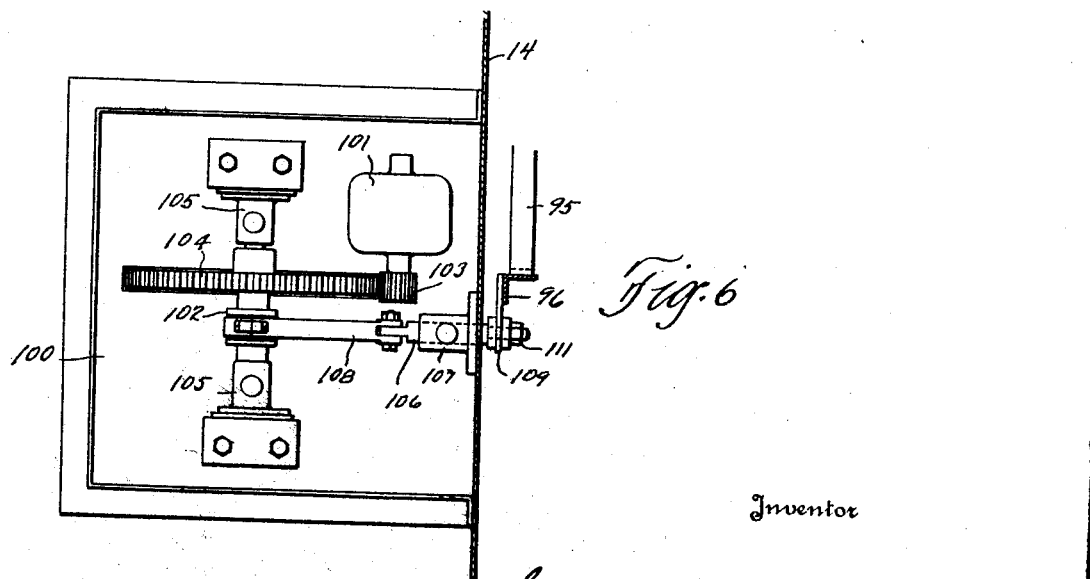

July 26, 1932.     G. A. BOESGER     1,868,876
DUST COLLECTOR
Filed Feb. 21, 1931     11 Sheets-Sheet 6

Inventor
George A. Boesger
By Hull Brock + West
Attorney

July 26, 1932. G. A. BOESGER 1,868,876
DUST COLLECTOR
Filed Feb. 21, 1931 11 Sheets-Sheet 7

Inventor
George A. Boesger
By Hull Brock + West
Attorney

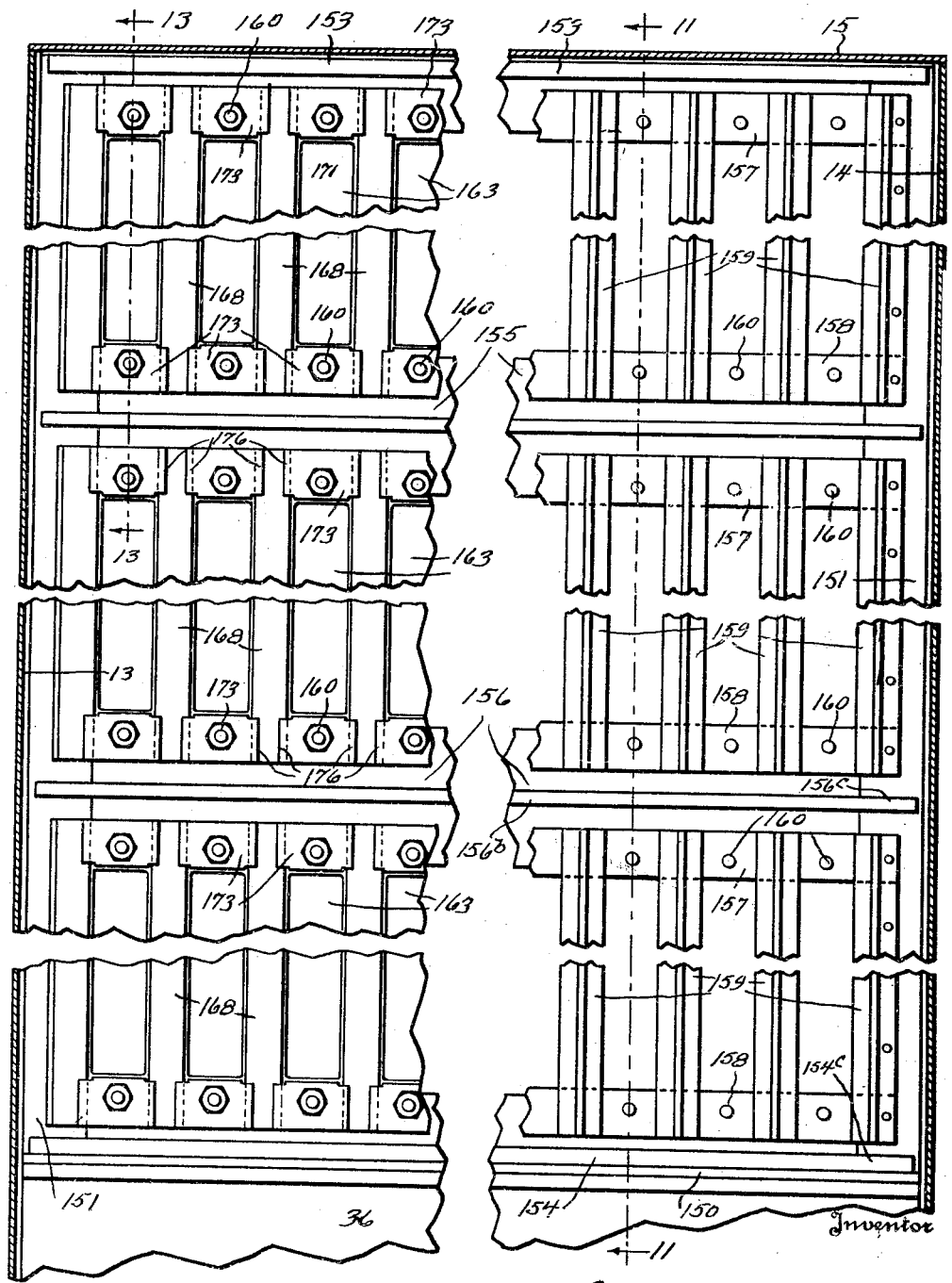

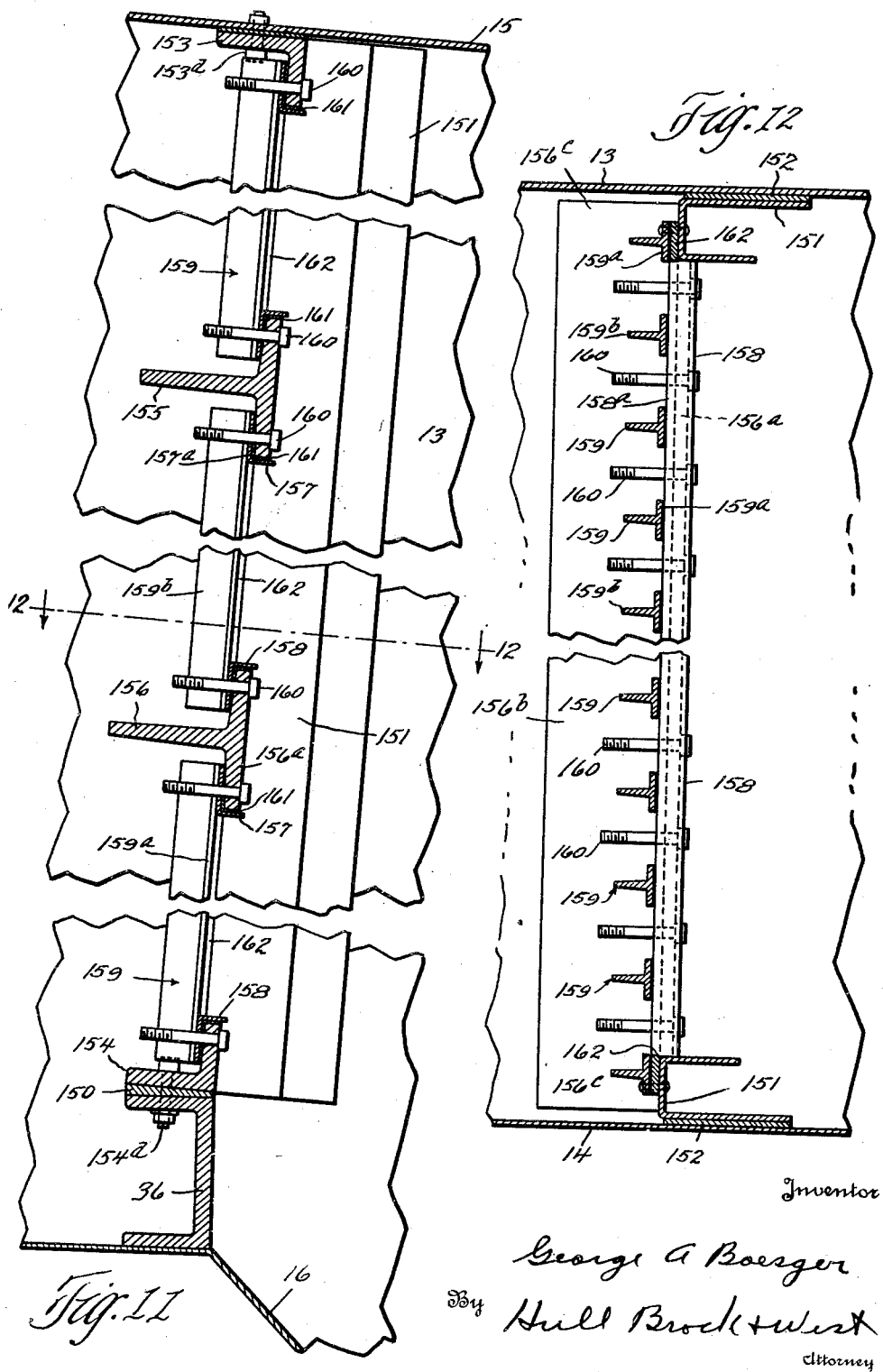

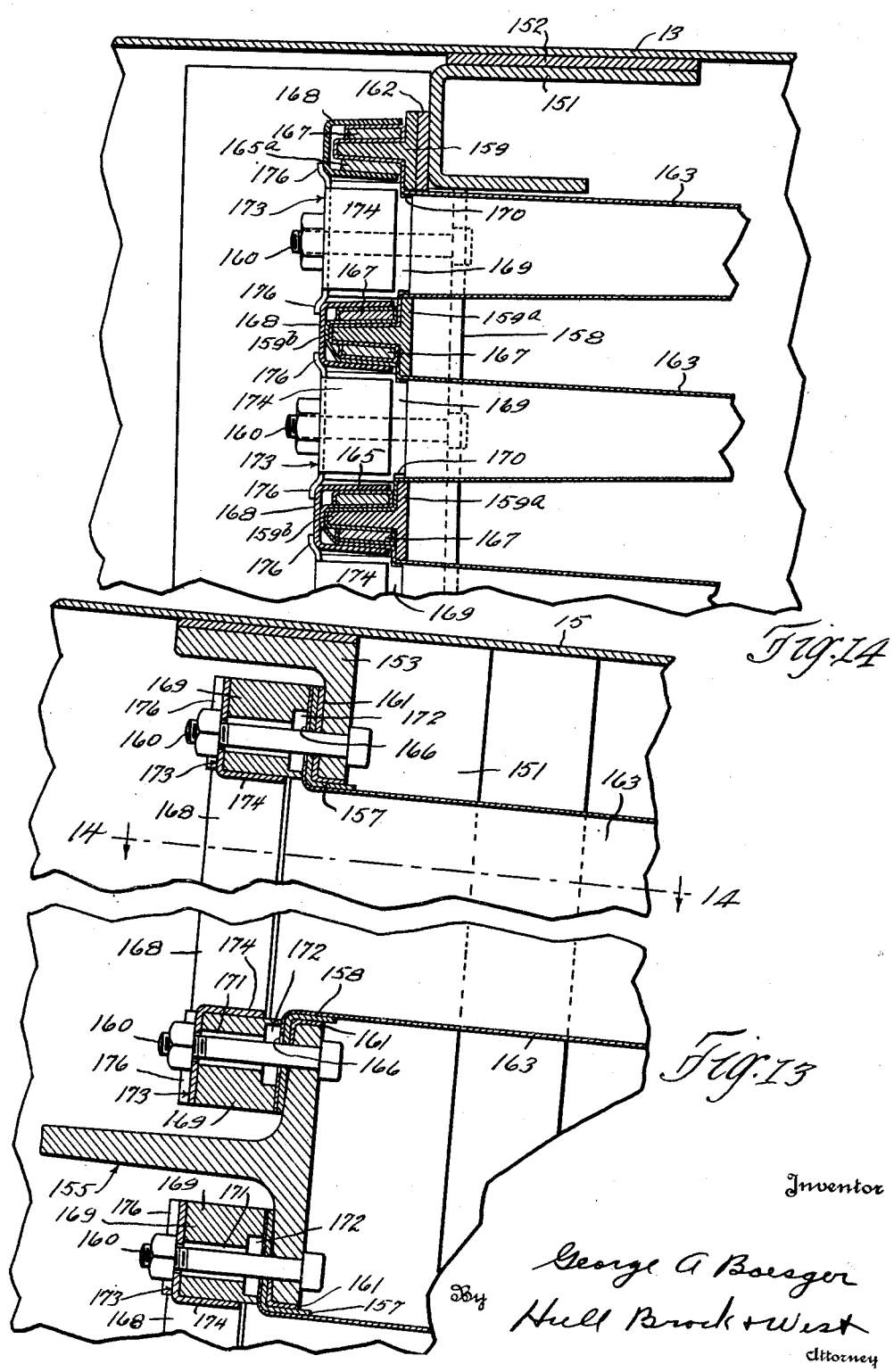

July 26, 1932. G. A. BOESGER 1,868,876
DUST COLLECTOR
Filed Feb. 21, 1931 11 Sheets-Sheet 11
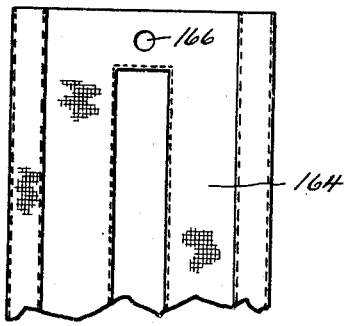
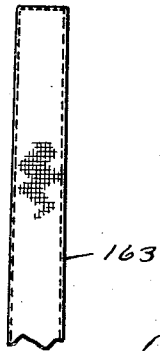
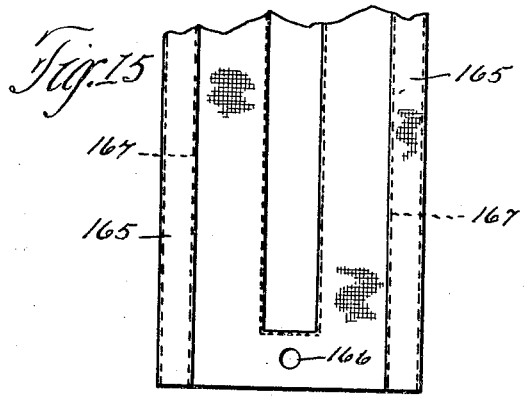
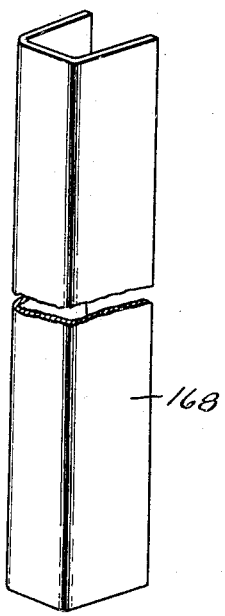
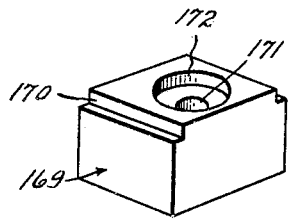
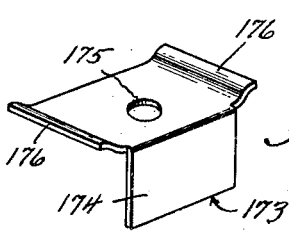
Inventor
George A. Boesger
By Hull Brock + West
Attorney Patented July 26, 1932

1,868,876

UNITED STATES PATENT OFFICE

GEORGE A. BOESGER, OF FAIRVIEW VILLAGE, OHIO, ASSIGNOR TO THE W. W. SLY MANUFACTURING COMPANY, OF CLEVELAND, OHIO, A CORPORATION OF OHIO

DUST COLLECTOR

Application filed February 21, 1931. Serial No. 517,457.

This invention relates to apparatus for the collection or suppression of dust or like substance or material, created in industrial or other operations.

The general object of my invention is to provide a dust collector which may be used to separate dust like substance from the air or other gases either for the recovery of the dust itself or for purifying the air or gases.

A further object of my invention is to provide a collector wherein the screens are made up in sectional units so that practically any capacity collector may be made up from such units.

Other objects of the invention are to provide a device including woven envelope-like screens which provide a large area of filtering surface in a small space; to provide a device which includes means for beating the screens to remove accumulated dust from the surface thereof; to provide a device wherein the screens are readily removed from the units so that they may be repaired or replaced when necessary; to provide means for maintaining the screens under a predetermined, uniform tension and to provide means for holding the sides of the screens in spaced relation against the pressure of the air being filtered.

With these and other objects in view which will be apparent from the description the invention resides in all the novel features of construction and combination of parts hereinafter described, shown in the drawings, and particularly pointed out in the appended claims.

Figure 7:
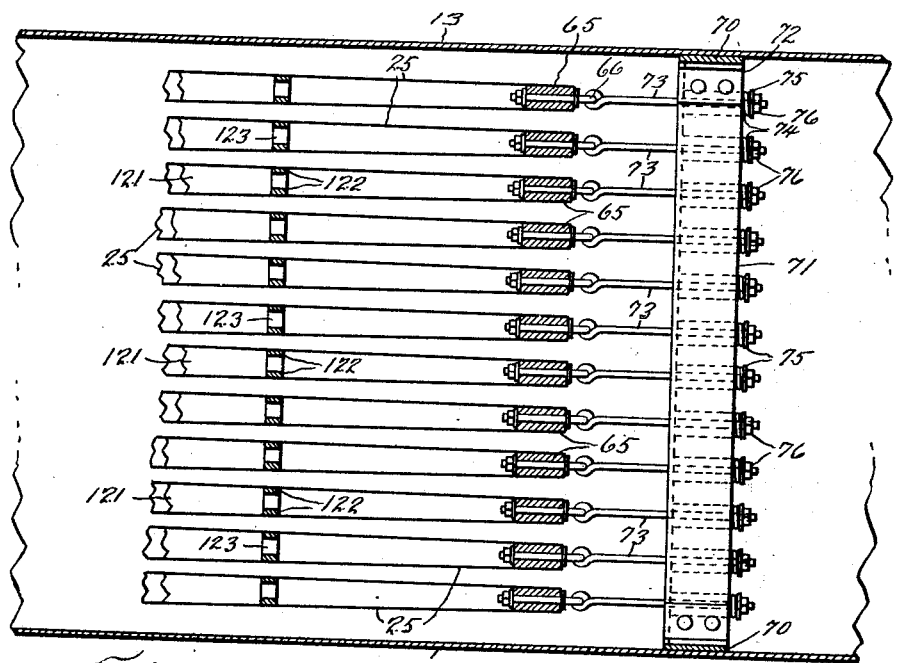
Figure 8:
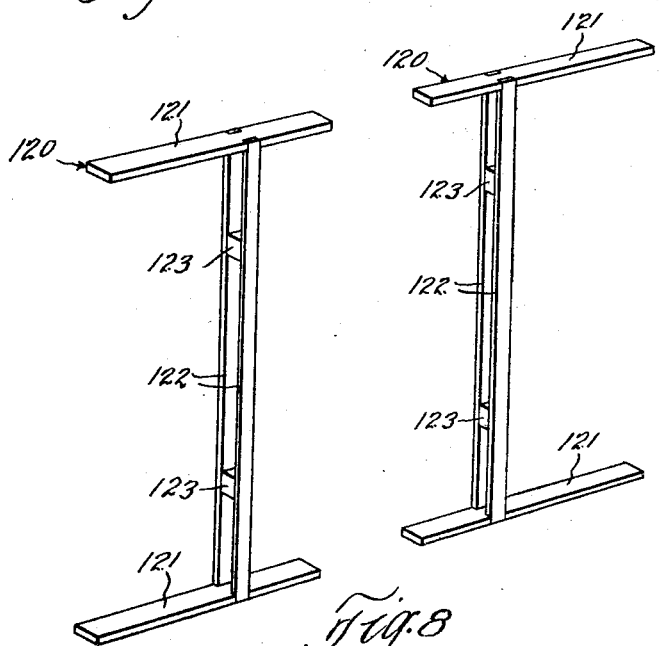
Figure 9:
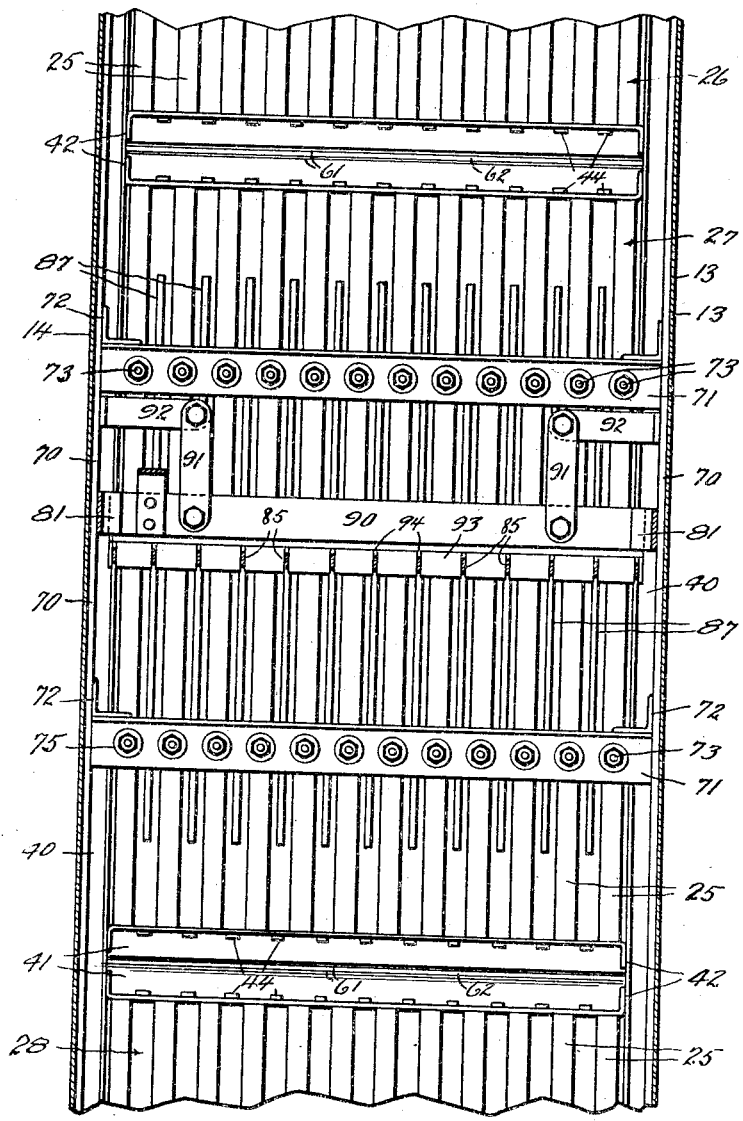

In the accompanying drawings, Fig. 1 is a side elevation of the dust collector with part of the casing broken away; Fig. 2 is an enlarged side elevation of one of the screen units with a fragmental elevation of the beater mechanism; Fig. 3 is a detailed vertical section of the frame structure for holding the open end of the screens; Fig. 4 is a horizontal sectional view through a screen unit above the center thereof; Fig. 5 is a detailed horizontal section of the screens and frame to which they are secured; Fig. 6 is a top plan view of the operating device for the beater mechanism; Fig. 7 is a fragmental horizontal section of the rear part of a screen showing the tensioning mechanism; Fig. 8 is a perspective of the reinforcing member for the inside of the screens; Fig. 9 is a fragmental end elevation of the screens and beater mechanism; Fig. 10 is a sectional view showing the bag containing frames in elevation, one portion of the figure showing the bags in place and the other portion showing them removed; Fig. 11 is a section on line 11—11 of Fig. 10; Fig. 12 is a section on line 12—12 of Fig. 11; Fig. 13 is a section on line 13—13 of Fig. 10; Fig. 14 is a section on line 14—14 of Fig. 13; Fig. 15 is an end elevation of one of the bags; Fig. 16 is a side view thereof and Figs. 17, 18 and 19 are detailed views.

In describing my invention reference is made to the accompanying drawings in which like reference numerals designate like parts in the several views. In the embodiment of my invention illustrated in Figs. 1 to 9 inclusive, 10 designates the casing of the dust collector which comprises a front wall 11, rear wall 12, side walls 13 and 14, a top wall 15 and a bottom which includes a funnel portion 16 provided with a valved outlet 17 at the lower end thereof. This casing 10 is supported on suitable standards 18. Leading from whatever source air or other gas is to be taken to be freed from dust, and connected into the rear wall 12 near its center is an intake conduit 19. A suction conduit 20 connects the front of the casing to an air pump or fan 21 which draws the air or other gas to be freed of dust through the dust collector and discharges it through the conduit 22 to the space where the same is to be used. The casing 10 in the form shown is made of sheet metal and is, of course, dust proof.

Within the casing 10 are dust collecting screens 25 arranged in units 26, 27 and 28, three such units being shown in the drawings disposed one above the other. Each screen 25 is made of a single piece of woven fabric of suitable mesh and is constructed in the form of a substantially rectangular bag having one open end from which outwardly directed flange portions 29 extend. Suitable eyelets are provided in the flange portions which engage over fastening means on the front frame 30 of the units by which the bags are clamped in place. The bags are positioned in the casing 10 with their open ends disposed toward the front and as will be noted the bags are substantially square in side elevation (Figs. 1 and 2) while in plan they are relatively narrow with the front open ends slightly wider than the rear closed end (Figs. 4 and 5). It is understood of course that the screens need not conform to the shape shown in the drawings but it is desirable to construct them so that they occupy the minimum amount of space consistent with the proper distribution of dust and the air pressure within the casing 10.

The screen bags 25 are constructed so that the warp threads extend lengthwise thereof (from the open to closed ends) so that these threads which are usually the stronger will resist the pull of the tensioning means for the screens which is hereinafter described.

The walls 13, 14 and 15 of the casing 10 are provided with reinforcing strips 35 and the bottom with a supporting angle bar 36 (Fig. 1) to which the front frames 30 of the dust collector units 26, 27 and 28 are secured. The front frame 30 of these units comprises upright side members 40 which are U-shaped in cross-section as shown in Figs. 4 and 5 and top, bottom and intermediate transverse Z bars 41. The ends 42 of the inner flanges of the bars 41 are bent outward and rigidly secured to the uprights 40 (Figs. 1, 2 and 3) forming a rigid rectangular frame. Extending between the Z bars 41 of each unit are upright members 43 which form the side supports for the screens 25, and which are spaced from each other a distance equal to the width of the open end of the screens.

The inner flange of each Z-bar 41 is provided with apertures which receive reduced end portions of the uprights 43. The reduced end portion 44 at the bottom of each upright is sufficiently long to permit the same to be inserted in the aperture in the lower bar 41 far enough to allow the reduced portion 45 at the upper end to be engaged in the aperture in the upper bar. The upright 43 is then moved upwardly until the shoulder 46 at the upper end engages the bar 41. A block 47 is secured to the outer face of the reduced end 44 by means of a screw 48 so that the upright is securely held in place yet is readily removable in case repairs are necessary.

Extending through the uprights 43 are a plurality of square or polygonal headed bolts 50. These bolts are inserted from the rear so that their threaded ends project out at the front of each of the uprights. To hold the bolts 50 in place when the nuts 51 are removed and to prevent their turning, a strip 52, provided with notches in which the heads of the bolts fit, is secured to the rear face of each upright over the bolt heads by means of the screws 53 (Fig. 2). The uprights 40 at each side of the units are provided with apertures through which bolts 54 extend with their threaded ends projecting outwardly. These bolts 54 are welded or otherwise secured in the U-bar 40 so that they will not drop out or turn when the nuts 51 are removed or when they are being tightened or loosened. The eyelets in the flanges 29 on the vertical sides of the screen bags 25 are engaged over the bolts 50 and 54. Clamping strips 55 having apertures spaced to receive the bolts 50 and 54 are placed on the outer end of these bolts and the nuts 51 tightened. The lateral flanges 29 of the bags 25 are thereby clamped tightly to the uprights 43. The vertical flanges of the horizontal members 41 are provided with apertures through which bolts 56 extend with their threaded ends projecting outwardly. These bolts are also welded or otherwise secured in the members 41. These bolts 56 are spaced so that one is positioned midway between the uprights 43 and between the side members 40 and the adjacent uprights 43. The eyelets in the flanges 29 at the top and bottom of the screens engage over these bolts 54 and by means of washers 57 and nuts 51 these flanges are clamped tightly to the horizontal members 41. By means of the strips 55 and washers 57 the bags are tightly clamped in the frame 30 so that no dust can pass therethrough.

The intermediate horizontal members 41 of the units 26, 27 and 28 are secured together by bolts 60 which pass through their adjacent outer flanges. Interposed between these flanges before they are bolted together, to provide a dust proof joint are strips 61 of tarred paper or tarred felt between which is a thin strip of wood 62.

The vertical side members 40 of the units are bolted or otherwise tightly secured to the reinforcing strips 35. The outer flange of the Z-member 41 of the upper unit 26 is similarly secured to the top reinforcing strip 35 and the lower flange of the bottom unit securely bolted to the supporting beam 36 at the bottom of the casing.

The frame 30 with the screens 25 secured therein in the manner above described constitutes a dust proof wall or partition in the container 10.

In the closed end of each screen 25 is a wood strip 65 which is the same width and thickness of that end of the screen so that it will maintain it in extended position. This strip is secured in the screen bag by means of eye bolts 66, the eyes of which are engaged by the tensioning means hereinafter described.

Rigidly secured to the side walls 13 and 14 of the casing 10 and to the rear of the screens 25 are reinforcing strips 70 similar to the strips 35 to which the frame 30 is secured. Behind each unit 26, 27 and 28 and extending between the side walls 13 and 14 are two horizontally disposed cross members 71 the ends of which are rigidly secured to the reinforcing strips 70 by L-brackets 72. The cross members 71 are L-shaped in cross section and have one flange disposed in substantially parallel relation with the rear end of the screens 25. This flange on each of the cross members 71 is provided with a series of apertures, each aperture being positioned directly behind a screen. Through these apertures extend eye bolts 73 the eyes of which interengage with the eyes in the bolts 66 in the screens 25. On the other end of each eye bolt 73 and on the opposite side of the member 71 is a sleeve 74, at the outer end of which sleeve is a washer 75 somewhat larger in diameter than the sleeve. Both the sleeve and washer are held on the bolts by a nut 76. The bolts 73 are threaded for some distance to permit a substantial range of adjustment of the eye bolts in the cross members 71. About the sleeve 74 and compressed between the flange through which the bolts pass and the washer 75 is a coil compression spring 77 which when extended to its normal length is somewhat longer than the sleeve 74.

With the front end of the screens 25 held securely in the front frame 30, the nuts 76 on the bolts 73 are tightened until the springs 77 are compressed to a point where the sleeves 74 begin to take the pressure. By this arrangement each screen is put under the same tension. As the fabric stretches the springs 77 expand and maintain the screens under substantially the same tension.

For agitating the screens to prevent them from being clogged up with the dust, beaters are provided.

Behind each screen unit 26, 27 and 28 is a transverse member 80 secured to the upright reinforcing strips 70 by a U-shaped fitting 81. Depending from the transverse member 80 are headed bolts 82 secured thereto at their threaded end by nuts 83 and providing a bearing portion between the one nut 83 and the head. To the front uprights 40 and 43 are secured hook members 84.

Flexible metal straps 85 with loops 86 at each end extend between the screens 25, one end hooked on a hook member 84 and the other end on a bolt 82. Sufficient play is permitted between the ends of the straps and their respective securing means 82 and 84 so that they may be vibrated laterally to strike the adjacent screens. Vertical beater rods 87 are secured to the straps 85 to vibrate therewith.

To vibrate the straps 85 of each unit laterally movable bars 90 are provided, swung by links 91 from brackets 92 secured to the upright members 70. The ends of these bars 90 bear against the front arms of the U-brackets 81 to the rear arms of which the transverse members 80 are secured. A member 93 provided with slots 94 in which the flexible straps 85 fit is secured to the bar 90 to move therewith. Suitable brackets 95 connect the rods 90 with a vertical bar 96. By moving the bar 96 laterally back and forth the straps 85 of each unit 26, 27 and 28 are vibrated.

The mechanism for vibrating the vertical bar 96 and hence the bars 90 and straps 85 is secured on the outside of the casing 10 on a frame designated generally by reference numeral 100. On this frame is mounted a motor 101 which drives a crank shaft 102 by means of the intermeshing gears 103 and 104 on the motor shaft and crank shaft respectively. The crank shaft 102 which is journaled in bearings 105 is connected to a reciprocating plunger rod 106 by the connecting rod 108, the reciprocating rod being slidably received in bearing 107. The rod 106 passes through the side 14 of the casing 10 and at its inner end it is secured to the upright 96 by means of a bracket 109. For properly aligning these parts when assembling the same the bracket 109 is provided with a slot 110 in which the rod 106 extends and is clamped by the nut 111.

With the pump or fan 21 operating to draw the air through from the back to the front of the casing 10 the inside of each screen is subjected to a sub-atmospheric pressure and the air pressure on the outside of the screens tends to press the side walls of the screens together. To prevent this, spacers 120 (Fig. 8) are provided which are made in sections. These spacers comprise strips 121 of substantially the same width as the horizontal thickness of the screens 25, with connecting strips 122 one on each side and inset to provide a smooth joint connecting the same together. Spacer blocks 123 secured between the vertical strips 122 give greater strength to these strips which are made of very light pieces of wood. The air or gas may pass longitudinally through screens between the vertical strips 121. As shown in Fig. 2 the strips 122 extend the full vertical width of the screens.

For deflecting the dust ladened air so it will be distributed within the casing 10 over the screens 25 a baffle 120 is arranged over the inlet 19.

It will be noted that the units 26, 27 and 28 are tilted slightly so that they slope toward the back of the casing 10. By this arrangement the dust as it is shaken from the screens falls away from the dust wall 30 at the front of the screens and drops to the bottom 16 of the casing.

It is, of course, obvious that the casing 10 may be constructed two, three or more times as wide as shown and two or more units arranged therein with their adjacent uprights 40 clamped tightly together. By the construction shown there may also be any number of units arranged vertically, the screen tensioning and shaking structure being the same behind each unit, and the vertical shaker bar 96 lengthened to accommodate the number of units used.

From the above description it will be noted that screens are constructed and arranged in the frames so that they may be kept under a predetermined tension and give slightly under violent changes of air pressure within the container and are readily removed and replaced when necessary.

The cleaning device is made up of independent vibrating bands which are readily replaced if destroyed and all are operated from a single source of power, the construction being such that one or more units may be operated thereby without in any manner altering the construction of the beater structure of any unit.

The dust wall 30 is so constructed that it is capable of being constructed in single or multiple units so that dust collectors of various sizes may be readily built from the same units.

By constructing the dust arresting frame in units in which standard size screens are used any size collector may be made up without changing the size of these screens or the beater structure. The tensioning means for the units are all independently operable as are also the beaters 85 between the bags. The operating bars 90 of each unit are connected to a common shaker bar 96 which may be made as long or as short as necessary.

The operation of the device is obvious from the above description. With the inlet conduit 19 leading from the space from which the dust ladened air or gas is to be taken and the conduit 22 leading to the space where the dust freed air or gas is to be delivered, the pump 21 draws the air through the screens 25 in the casing. By agitating the screens with the beaters 85 the dust is kept from lodging in the screens and drops to the bottom of the casing from where it may be removed through the outlet 17 and discarded or used for whatever purpose desired.

The modification of my invention illustrated in Figs. 10 to 19 inclusive will now be described. It is to be understood that the structure of this modification is quite similar to that of the foregoing one, differing only in the details of construction of the bags or envelopes which act as screens and the frame which supports the front ends of these screens. It is to be understood that the casing in which this modified type is mounted will be that shown in Fig. 1 and the reference numerals will be observed to be the same on such parts as have been reproduced in the drawings illustrating the second modification.

As in the first modification, the bag supporting frame will be mounted on a channel iron 36. As in the preceding modification, the frame is tipped back slightly toward the top, a wedge shaped member 150 of wood, paper or suitable fibrous material being used to effect an air tight joint. By referring to Figs. 10, 11 and 12, it will be observed that the main frame is made up of a pair of channel members 151 which extend substantially vertically along the side walls 13 and 14 of the main housing of the dust collector. Reinforcing plates or bars 152 may be placed between the outer portion of the channel 151 and the wall for bracing purposes. To these channel members are connected top and bottom angle members 153 and 154. Extended parallel with and between the angles 153 and 154 are a plurality, any desired number, of T-irons 155 and 156. The angle irons and T-irons 153 to 156 are connected as by welding to the channels 151. It will be observed that the bases of these members are cut away to bring their surfaces flush with the adjacent surface of the angle members. This construction can be well observed in Fig. 10 at the right-hand side where it is evident that the base 156$^a$ of the T-iron 156 terminates at the left-hand edge of the channel member 151 while the T-portion 156$^b$ thereof has a terminal portion 156$^c$ extending over and in front of said channel member. Likewise it will be observed that the base 154$^a$ of the angle member 154 terminates at the left edge of the channel 151 while the outwardly extending portion thereof 154$^b$ is provided with a terminal portion 154$^c$ which extends outside of the channel 151. Reference to Fig. 12 will also disclose clearly the details of the T-member 156, just pointed out.

The angle members 153 and 154 and the T-members 155 and 156 define with the channels 151 a plurality of openings. Into each of these openings is inserted a smaller frame unit carrying a plurality of the bags or envelopes which act as screens. Each of these smaller frames is composed of a pair of upper and lower angle members 157 and 158, each of which extends in a horizontal direction, and a plurality of spaced substantially vertically extending T-members 159. The T-members 159 will be secured to the angle members 157 and 158 in any preferred manner, as by rivets or spot welding, the bases 159$^a$ of the T-members 159 being in flat contact with the bases 157$^a$ and 158$^a$ of the angle members 157 and 158. A plurality of bolts 160 extend through and are secured to the bases of the T-irons 155 and 156 and the angles 153 and 154 adjacent their edges for the purpose of securing the smaller frame units thereto. As will be evident from Figs. 12 and 14, the angles 157 and 158 have their webs or upstanding portions bearing against the bases of the angles 153 and 154 and T-irons 155 and 156 and are cut away for a short distance adjacent the ends whereby to allow the flange 158$^b$ of the angle iron 158 to extend inwardly beyond the outer surface of the channel members 151. A gasket 161 which may be made of any suitable fibrous material, such as paper, felt or the like, is inserted between the angles 158 and the bases of the angles 153 and 154 and T-bars 155 and 156. Since the bases 157$^a$ and 158$^a$ of the angle members 157 and 158 extend between the outer surface of the channel members 151 and the bases 159$^a$ of the end T-bars 159 at the corners, it will be obvious that a space will exist between said outer surface of the channel 151 and the closest surface of the T-bar 159 which is adjacent thereto and separated therefrom by the bases of the channel members 157 and 158 and the gaskets 161, and that this space will have a thickness equal to that of said base 157$^a$ or 158$^a$ plus that of the intervening gasket. Since the connection of these frames must be airtight, I provide a filler 162 which may be made of wood or other suitable material of a size to fill this space and prevent the passage of air therethrough.

A slightly different form of screening bag or envelope is employed in connection with this modification, the details of which will be seen by reference to Figs. 15 and 16. Each of these envelopes consists of a body portion 163 into the closed end of which will be received members corresponding to those adapted to be connected to a vibrating mechanism through eye bolts, such as those 66, and connecting rods, such as those 73 (see Figs. 2 and 7), and an attaching flange portion 164 to which the portion 163 is sewed or otherwise connected and which is provided with hems 165 at the long edges and openings 166 at the ends adjacent the mouth of the body portion 163. A suitable stiffening member 167 may be inserted through the hems 165 for a purpose hereinafter to appear.

From the foregoing it will be obvious that when the bags or envelopes are attached, there will be presented by the small frame units an opening for reception of the flange portion 164 of the screening surface defined by the outer surfaces of the bases 159$^a$ of the T-irons 159 and the outer surface of the bases 157$^a$ and 158$^a$ of the angles 157 and 158. It will be observed that these surfaces do not lie in the same plane but that the outer surface of the bases 159$^a$ of the T-iron 159 are disposed outwardly of the other surfaces a distance equal to their own thickness. When the bags are inserted, the body 163 will pass through the opening defined by the members 157, 158 and 159 and the hems or bolts 160 will pass through the openings 166. In order for the bag to accommodate itself to the surfaces which provide the clamping action thereupon and upon the seal, it is necessary that it be bent upwardly along the lines of juncture of the long sides of the portion 163 with the flange portion 164. This will result in creases or right angle bends being formed in the end portions of the flange 164 beyond the ends of the mouth of the body portion 163 forming a continuation of the said juncture. The portions of the flange 164 at the two sides of the mouth of the body portion extend upwardly a short distance and then are bent over the corners of the bases 159$^a$ of the T-irons 159 and then followed around the web or T-portion 159$^b$, the hem and its contained stiffening member 157 lying upon the opposite side of the said web or T-portion. The bag which is positioned on the adjacent opening has the corresponding part following around the T-member 159$^b$ and over the hem and stiffening member 165 and 167, as is clearly shown in Fig. 14. After the bags are in position on the bolts 160, channel members 168 made of resilient material may be placed over each web or T-portion 159$^b$ in position to grip the hems and stiffening members 165 and 167 tightly together. Inasmuch as the T-portion 159$^b$ is slightly thinner at its outer end, the member 168 is somewhat flared and forms thus a simple and convenient means for wedging and firmly clamping the parts in place. These channel members preferably extend substantially the full length of the T-irons 159. Each of the openings 166 may be provided with a metallic eye. A block 169 provided with rabbeted corners 170 and a central opening 171 is placed over the bolts 160 and clamps firmly in position the end portion of the screens. A countersunk portion 172 is provided to receive the metallic eyelet which may be considerably thicker than the screen material itself. In order to hold the block 169 and channels 168 firmly in place, I provide an angular stamping 173 (see Fig. 19) which is provided with an end flange 174, a central opening 175 and wings 176. The opening 175 receives the bolt 160 and the wings 176 engage the channels 168, as clearly seen in Fig. 14. The flange 174 extends downwardly inside the blocks 169, as clearly indicated in Fig. 13.

While I have described the preferred illustrative modifications of my invention, I wish it understood that I am not limited to the details of such modifications, but may carry out my invention in various forms within the scope of the appended claims.

Having thus described my invention, what I claim is:

1. A dust collector including a casing, a retaining wall in said casing, a plurality of envelope-like screens secured in said wall adjacent each other, means for holding said screens in distended position, means for vibrating said screen including a flexible member extending therebetween carrying beaters adapted to strike the said screen, and means for vibrating said flexible member.

2. A dust collector including a casing, a dust obstructing frame in said casing, a second frame parallel with said dust obstructing frame, envelope-like screens each having its one open end secured dust tight in said dust obstructing frame, said screens being spaced one from the other with their closed ends extending toward said second frame, means on said second frame engaging said screens for maintaining them distended under a constant tension, beaters for said screens including flexible members extending between said screens with their ends secured to said frames, and means for vibrating said beaters.

3. In a dust collector including a casing, a dust retaining frame in said casing including side members rigidly secured together, two opposed side members being provided with spaced apertures, supporting members extending between said opposed side members having reduced ends removably fitting in said apertures, members projecting outwardly from one side of said side members and said supporting members, envelope-like screens having flanges at their open ends provided with eyelets engaged over said outwardly projecting members, and means cooperating with said outwardly projecting members for clamping said screens in said frame.

4. In a dust collector including a casing, a dust retaining frame in said casing including side members rigidly secured together, two opposed side members being provided with spaced apertures, supporting members extending between said opposed side members having reduced ends removably fitting in said apertures, members projecting outwardly from one side of said side members and said supporting members, envelope-like screens having flanges at their open ends provided with eyelets engaged over said outwardly projecting members and means cooperating with said outwardly projecting members for clamping said screens in said frame, and resilient means engaging the closed end of said screens for maintaining the same under tension.

5. In a dust collector, a casing, dust collecting means in said casing including horizontally spaced groups of vertically disposed envelope-like screens positioned one group above another, beaters secured in said casing, said beaters extending between adjacent screens of each group and adapted to contact therewith when vibrated, means for vibrating said beaters including a vertically disposed shaker arm extending behind said dust collecting means, means connecting said shaker arm to the beaters in each group, and means for vibrating said shaker arm.

6. In a device of the class described, a plurality of envelope-like screens arranged adjacent each other, a flexible member extending between said screens and carrying one or more beaters adapted to strike said screen, and means for actuating said flexible member to cause said beaters to strike said screens.

7. In a device of the class described, a dust retaining wall including a plurality of envelope-like screens positioned adjacent each other and having their open ends secured in dust tight relation whereby to constitute a part of said wall, said screens extending in the same general direction, a flexible member having one end secured between two of said screens adjacent their open ends and vibrating means connected to said flexible member at its other end, said flexible member carrying one or more beaters adapted to strike said screens.

In testimony whereof, I hereunto affix my signature.

GEORGE A. BOESGER.